United States Patent
Kawahara (10) Patent No.: US 6,380,973 B1
(45) Date of Patent: *Apr. 30, 2002

(54) IMAGE SENSING APPARATUS AND METHOD FOR IMAGE PROCESSING A MOVING IMAGE OR A STILL IMAGE

(75) Inventor: Norihiro Kawahara, Kawasaki (JP)

(73) Assignee: Canon Kabushiki Kaisha (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/654,186

(22) Filed: May 28, 1996

(30) Foreign Application Priority Data

Jun. 2, 1995 (JP) .............................. 7-136599
Jun. 29, 1995 (JP) .............................. 7-164219

(51) Int. Cl.⁷ ..................... H04N 5/225; H04N 5/335; H04N 9/64

(52) U.S. Cl. .................. 348/220; 348/234; 348/242; 348/253; 348/279; 348/702; 358/520; 382/167

(58) Field of Search .................. 348/155, 207, 348/220, 221, 222, 229, 266, 267, 272, 273, 279, 362, 363, 364, 208, 669, 670, 700, 701, 702, 234, 235, 236, 237, 241, 242, 250, 252, 253, 649–651; 358/518, 519, 520; 382/162, 167; H04N 5/225, 5/335, 9/64

(56) References Cited

U.S. PATENT DOCUMENTS

| | | | | |
|---|---|---|---|---|
| 4,733,297 A | * | 3/1988 | Katsumata et al. | 348/699 |
| 4,811,092 A | * | 3/1989 | Achiha | 348/702 |
| 4,930,012 A | * | 5/1990 | Fujita | 348/702 |
| 4,987,489 A | * | 1/1991 | Hurley | 348/578 |
| 5,051,826 A | * | 9/1991 | Ishii et al. | 358/140 |
| 5,208,662 A | * | 5/1993 | Song | 348/702 |
| 5,345,264 A | * | 9/1994 | Murata et al. | 348/235 |
| 5,420,635 A | | 5/1995 | Konishi et al. | 348/362 |
| 5,430,500 A | * | 7/1995 | Hoshino | 348/666 |
| 5,473,441 A | * | 12/1995 | Inuiya | 348/702 |
| 5,500,674 A | * | 3/1996 | Takase et al. | 348/208 |
| 5,523,786 A | * | 6/1996 | Parulski | 348/269 |
| 5,633,677 A | * | 5/1997 | Okino | 348/229 |
| 5,648,818 A | * | 7/1997 | Fukatsu | 348/273 |
| 5,926,224 A | * | 7/1999 | Nagasawa | 348/413 |

FOREIGN PATENT DOCUMENTS

| | | | | |
|---|---|---|---|---|
| EP | 0 544 333 A2 | | 2/1993 | H04N/3/15 |
| JP | 58-177078 | * | 10/1983 | H04N/5/02 |

OTHER PUBLICATIONS

Abstract, JP 07 177434 A, Jul. 14, 1995, Haraikawa Kouji, "Television Camera Device".

* cited by examiner

Primary Examiner—Wendy Garber
Assistant Examiner—Ngoc-Yen Vu
(74) Attorney, Agent, or Firm—Morgan & Finnegan, LLP (57) ABSTRACT

An image in a field inputted by interlace scanning is delayed for a time period corresponding to one field, then, by comparing the delayed image signals and the not-delayed image signals of the image, a movement detecting unit determines whether the input image is a moving image or a still image and outputs a signal indicating the determined result. A selecting unit which includes an image combining unit combines the delayed image signals and the not-delayed image signals, and selects either the combined image signals or not-combined image signals on the basis of the detected result by the movement detecting unit. Accordingly, the image signals realizing a high quality image displayed on a multimedia device are obtained.

19 Claims, 11 Drawing Sheets

IMAGE SENSING APPARATUS AND METHOD FOR IMAGE PROCESSING A MOVING IMAGE OR A STILL IMAGE

BACKGROUND OF THE INVENTION

The present invention relates to an image sensing apparatus and method and, more particularly, to an image sensing apparatus and method utilizing an image sensing device, such as a CCD (charge coupled device).

Figure 4:
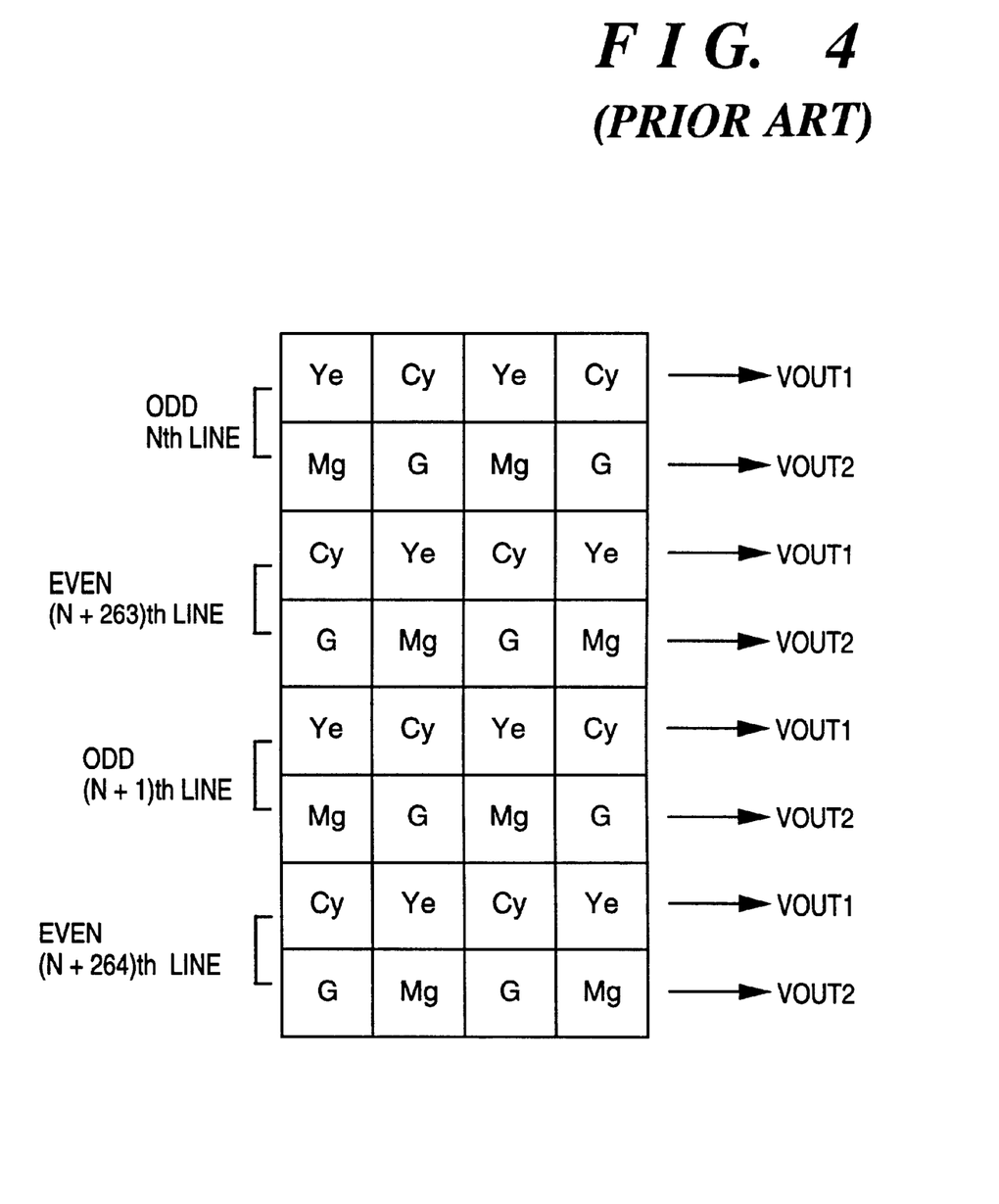
FIG. 4 shows an arrangement of color filters used in the image sensing apparatus of the present invention and in a conventional image sensing apparatus.
Figure 11:
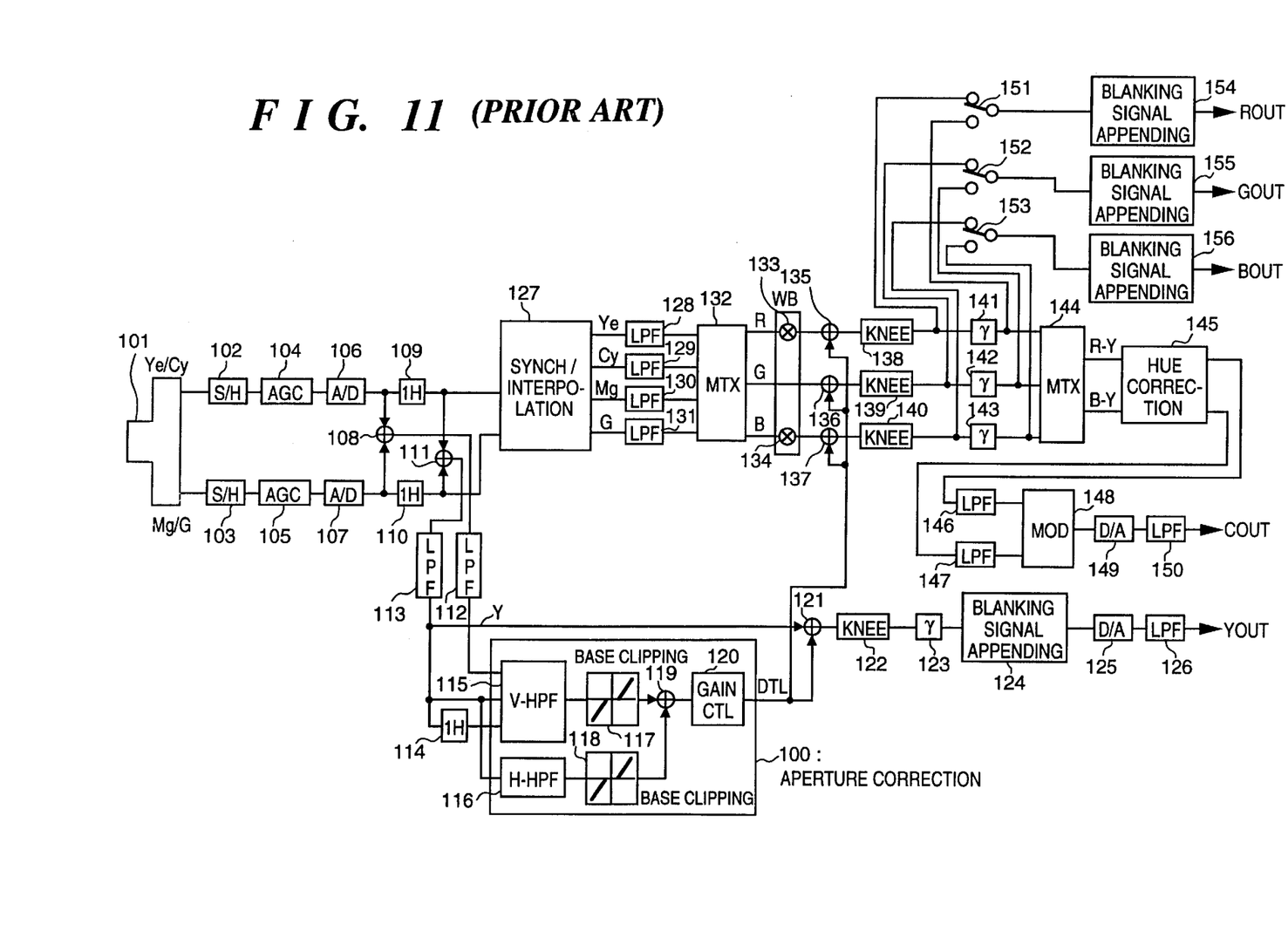
FIG. 11 is a block diagram showing a configuration of a conventional image sensing apparatus.

A configuration of a conventional image sensing apparatus is shown in FIG. 11. Color filters are independently provided for even-numbered field and for odd-numbered field of a solid-state image sensing device 101 using interlace scanning, as shown in FIG. 4. Referring to FIG. 4, signals of Ye (yellow) and Cy (cyan) components are alternatively read out as VOUT1, and signals of Mg (magenta) and G (green) components are alternatively read out as VOUT2.

These signals outputted as VOUT1 and VOUT2 are applied with sample and hold processing in the sample and hold (S/H) circuits 102 and 103 shown in FIG. 11. Thereafter, the signals enter an automatic gain controller (AGC) where the signals are amplified with automatically controlled gains, then analog-digital converted to digital signals by an analog/digital (A/D) converters 106 and 107. The digital signals outputted from the A/D converters 106 and 107 enter memories 109 and 110 having the capacity to store television signals of one horizontal period (abbreviated as "1H", hereinafter) and are delayed there, as well as inputted to an adder 108 where added together. The outputs from the memories 109 and 110 enter an adder 111 where they are added. As a result of the addition, luminance signals are generated.

The outputs from the adders 108 and 111 enter low-pass filters 112 and 113, respectively, where color carrier signals are removed. The output from the low-pass filter 113 is delayed by using a memory 114 having a capacity of storing signals of 1H. The outputs from the low-pass filters 112 and 113 and the outputs from the memory 114 are luminance signals in continuous 3H. The luminance signals in continuous 3H are inputted into an aperture correction circuit 100 where high-frequency components of the inputted signals are extracted by using a high-pass filter 115 provided within the aperture correction circuit 100. Thereafter, noises are removed from the extracted high-frequency components of the signals by a base-clipping circuit 117, thereby an aperture correction signal in the vertical direction is produced. Meanwhile, high-frequency component of the output from the low-pass filter 113 is extracted by a high-pass filter 116, then noises are removed from the extracted high-frequency component by a base-clipping circuit 118, thereby an aperture correction signal in the horizontal direction is produced. These aperture correction signals in the vertical and horizontal directions are added by an adder 119, then the signal level of the added signal is adjusted by a gain controller 120 so as to restrain the gain upon aperture correction on a low luminance signal, thus a detail (DTL) signal is generated.

Then, aperture correction is performed in such a manner that the phase of the output from the low-pass filter 113 and the phase of the DTL signal are synchronized by using a delay circuit (not-shown) and the signals are added by an adder 121.

The luminance signals which are processed with the aperture correction is then amplified by a gain which is set to restrain the high luminance component in a knee circuit 122. Thereafter, the luminance signal is applied with γ correction by a γ correction circuit 123, further, appended with a blanking signal by a blanking signal appending circuit 124. Furthermore, the signal is digital-analog converted to an analog signal by a digital/analog (D/A) converter 125, passes through a low-pass filter 126, then becomes a video luminance signal YOUT.

Meanwhile, the outputs from the memories 109 and 110 are inputted to a synchronization/interpolation circuit 127 where each of color components (here, yellow (Y), cyan (Cy), magenta (Mg) and green (G) components) of the signals are synchronized. From these respective components, returned components are removed by low-pass filters 128 to 131. Further, a matrix operation, $$\begin{pmatrix} R \\ G \\ B \end{pmatrix} = \begin{pmatrix} A_{11} & A_{12} & A_{13} & A_{14} \\ A_{21} & A_{22} & A_{23} & A_{24} \\ A_{31} & A_{32} & A_{33} & A_{34} \end{pmatrix} \begin{pmatrix} Ye \\ Cy \\ Mg \\ G \end{pmatrix}$$ Equation 1 is performed in a matrix operation circuit 132 to obtain R, G and B components. These R, G and B components are applied with white balance correction controlling their gains with respect to the gain of the G component by a multipliers 133 and 134 in a white balance circuit. Each of the R, G and B components which are processed with the white balance correction is added to the DTL signal outputted from the gain controller 120 in a corresponding adder 135, 136 or 137. Thereby, high frequency components of the R, G and B components are enhanced.

The color signals are then amplified with gains which are set to restrain high luminance component in respective knee circuits 138 to 140, further applied with the γ correction in γ correction circuits 141 to 143. Thereafter, color difference signals R-Y and B-Y are generated by performing the following operation, $$\begin{pmatrix} R-G \\ B-Y \end{pmatrix} = \begin{pmatrix} B_{11} & B_{12} & B_{13} \\ B_{21} & B_{22} & B_{23} \end{pmatrix} \begin{pmatrix} R \\ G \\ B \end{pmatrix}$$ Equation 2 in a matrix operation circuit 144. After hues of these color difference signals are corrected in a hue correction circuit 145, high-frequency components of the corrected color difference signals are removed by low-pass filters 146 and 147 so as to become suitable to subsequent modulation. Next, the signals are modulated and appended with a burst signal in a modulation circuit, then converted to an analog signal by a D/A converter 149. Thereafter, the signal pass through a low-pass filter 150 to be a video color signal COUT.

Further, the outputs from the respective knee circuits 138 to 140 and the respective outputs from the γ correction circuits 141 to 143 are sent to respective selectors 151 to 153. The selected signals are added with blanking signals in blanking signal appending circuits 154 to 156, thus become red digital signals ROUT, green digital signals GOUT and blue digital signals BOUT. These digital signals are inputted to a multimedia device (not-shown), such as a computer and a printer. The selectors 151 to 153 select the signals depending upon whether the multimedia device requires the γ correction or not.

However, according to the aforesaid conventional apparatus, interpolation is performed prior to the matrix operation for obtaining R, G and B components upon synchronizing respective color components of signals inputted from the CCD, frequency band of signals in the horizontal direction is narrow. This does not affect quality of an image when the signals are outputted on a television monitor. However, when the image is displayed based on the R, G and B digital signals on a display of a multimedia device, such as a computer and a printer, it causes a problem in which satisfactory resolution can not be achieved and reproduced colors are blur. The drop of the quality of resolution and blur in color are noticeable especially in a still image.

Further, an aperture correction component of luminance signal is added to R, G and B components to achieve a high quality image. However, by doing so, when a moving image is to be outputted by a printer as a still image, dark parts of the image have dazzling texture because the aperture correction signals in the low frequency component is not constrained enough and noise components are not removed satisfactorily.

SUMMARY OF THE INVENTION

The present invention has been made in consideration of the above situation, and has as its object to realize improvement in image quality, when image signals are to be outputted on a multimedia device, by switching contents of luminance signal processing and of color signal processing depending upon whether a moving image or a still image is inputted.

According to the present invention, the foregoing object is attained by providing an image sensing apparatus comprising: image sensing means for sensing an image of an object and generating first image signals and second image signals; delaying means for delaying the first image signals for a predetermined time period and outputting delayed image signals corresponding to each of the first image signals; detecting means for detecting movement of the image on the basis of comparing the second image signals against the delayed image signals; and first processing means for applying a predetermined image process to color components of the second and delayed image signals or of the first image signals in accordance with a detected result by the detecting means, wherein the first image signals are produced during first image scanning periods and the second image signals are produced during second image scanning periods, immediately following first image scanning periods.

In accordance with the present invention as described above, the image sensing apparatus further comprises matrix operation means for performing matrix operation on the image signals processed by the first processing means on the basis of the detected result by the detecting means.

Furthermore, in accordance with the present invention, the image sensing apparatus described further comprises second processing means for applying a predetermined image process on a luminance component of the first image signals in accordance with the detected result by the detecting means.

Further, the foregoing object is also attained by providing an image sensing method comprising: an image sensing step of sensing an image of an object and generating first image signals and second image signals; a delaying step of delaying the first image signals for a predetermined time period and outputting delayed image signals corresponding to each of the first image signals; a detecting step of detecting movement of the image on the basis of comparing the second image signals against a delayed image signals; and a first processing step of applying a predetermined image process to color components of the second and delayed image signals or of the first image signals in accordance with the detected result at the detecting step, wherein the first image signals are produced during first image scanning periods and the second image signals are produced during second image scanning periods, immediately following first image scanning periods.

Other features and advantages of the present invention will be apparent from the following description taken in conjunction with the accompanying drawings, in which like reference characters designate the same or similar parts throughout the figures thereof.

BRIEF DESCRIPTION OF THE DRAWINGS

The accompanying drawings, which are incorporated in and constitute a part of the specification, illustrate embodiments of the invention and, together with the description, serve to explain the principles of the invention.

DETAILED DESCRIPTION OF THE PREFERRED EMBODIMENTS

Preferred embodiments of the present invention will be described in detail in accordance with the accompanying drawings.

<First Embodiment>

Figure 1:
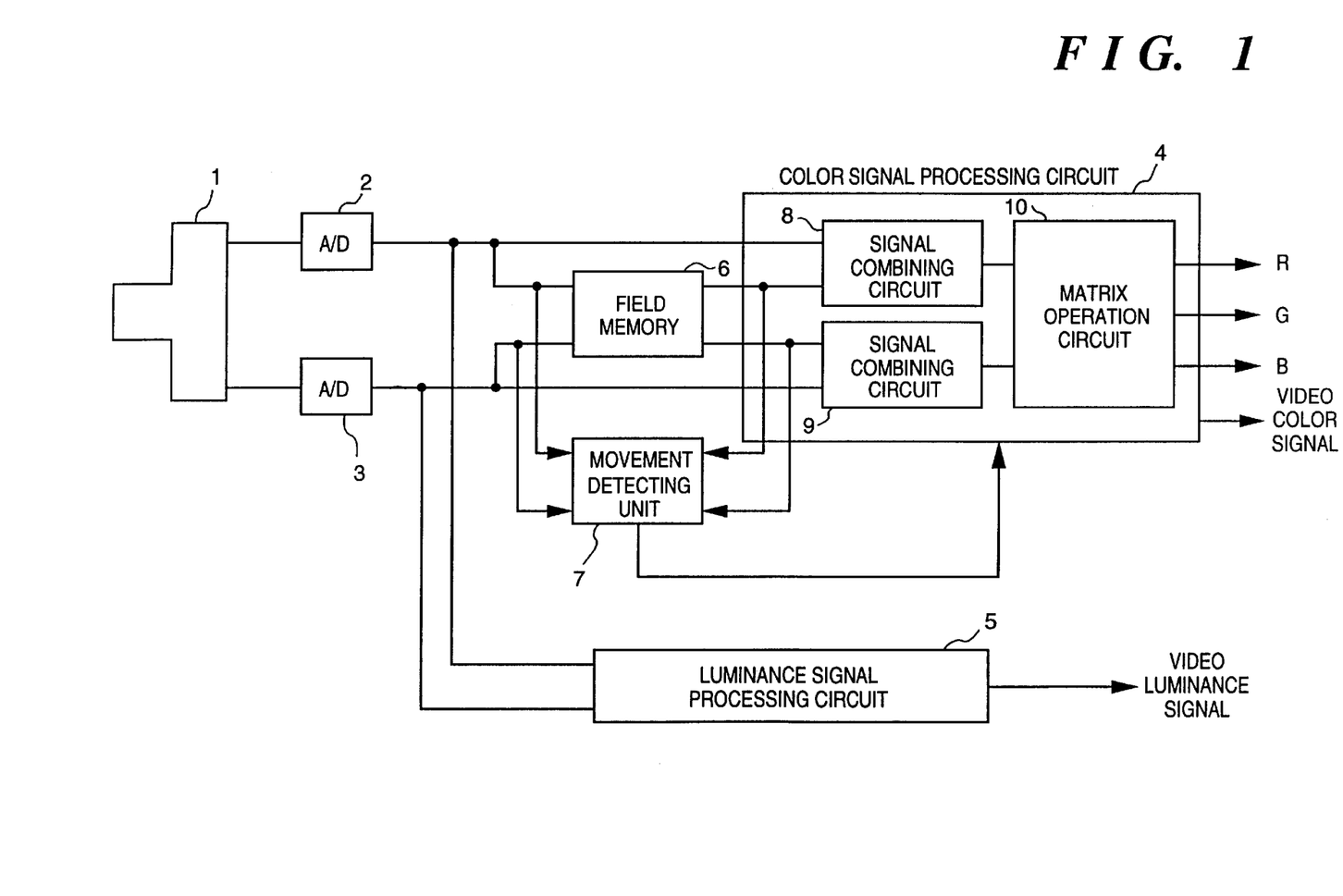
FIG. 1 is a block diagram conceptually illustrating a part of a configuration of an image sensing apparatus according to first and second embodiments.

A first embodiment of the present invention is based on a concept illustrated in FIG. 1. Referring to FIG. 1, signals outputted from two different output terminals of a solid-state image sensing device 1 (e.g., a signal of Ye and Cy components and a signal of Mg and G components as shown in FIG. 4) are respectively analog-digital converted to digital signals by A/D converters 2 and 3. Each of these digital signals are processed in a color signal processing circuit 4 and a luminance signal processing circuit 5. Further, the signals from the two terminals are also delayed in a field memory 6 for a time period corresponding to one field of television signals. The delayed signals are synchronized with not-delayed signals in signal combining circuits 8 and 9. R, G and B signals are generated from these synchronized signals by a matrix operation circuit 10 in the color processing circuit 4.

Meanwhile, a movement detecting unit 7 detects movement of an input image in one field period and the color signal processing circuit 4 is controlled depending upon whether the image is a moving image or a still image.

Next the first embodiment will be described with reference to FIG. 2. Note, in FIG. 2, units and element having the same or similar functions as those in FIGS. 1 and 11 are referred by the same reference numerals, and explanations of their functions and operation are omitted.

Figure 2:
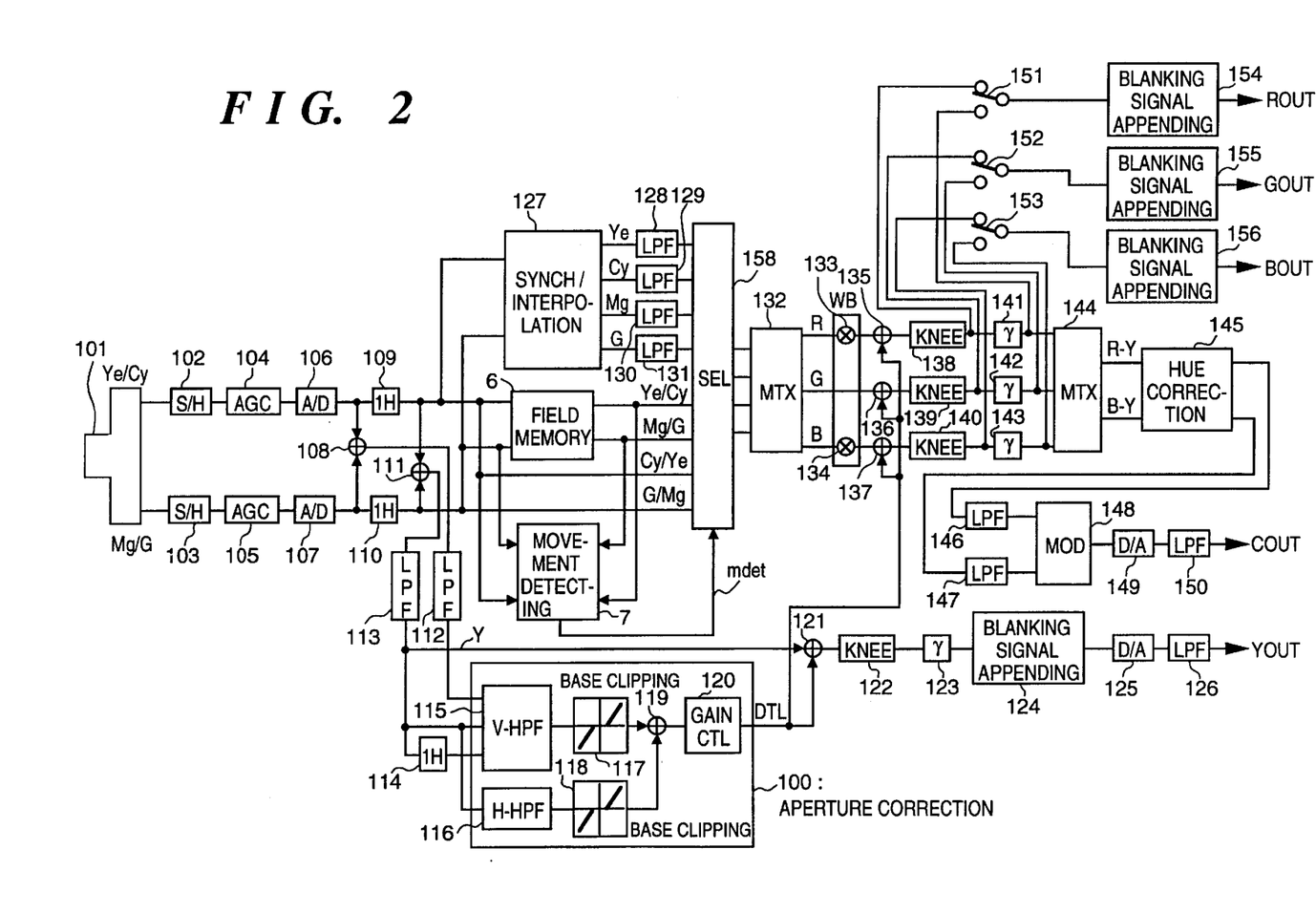
FIG. 2 is a block diagram illustrating a configuration of the image sensing apparatus according to the first embodiment.

FIG. 2 depicts a detailed configuration of an image sensing apparatus according to the first embodiment, in which the field memory 6, a selector 158, and the movement detection unit 7 are added to the configuration shown in FIG. 11.

Operation of the image sensing apparatus having aforesaid configuration is described below.

Similarly to the operation explained with reference to FIG. 11, outputs from the memories 109 and 110 for delaying for 1H enter the synchronization/interpolation circuit 127 in this embodiment, and each of color components (here, Ye, Cy, Mg and G) is synchronized. Returned components are removed from these color components by low-pass filters 128 to 131, then the color component signals are inputted to the selector 158 in this embodiment. Further, the outputs from the memories 109 and 110 are also inputted to the field memory 6, where the signals are delayed for a time period corresponding to one field. In this manner, data from lines indicated as "odd" in FIG. 4 and data from lines indicated as "even" are sent to the selector 158 at the same timing.

Figure 3:
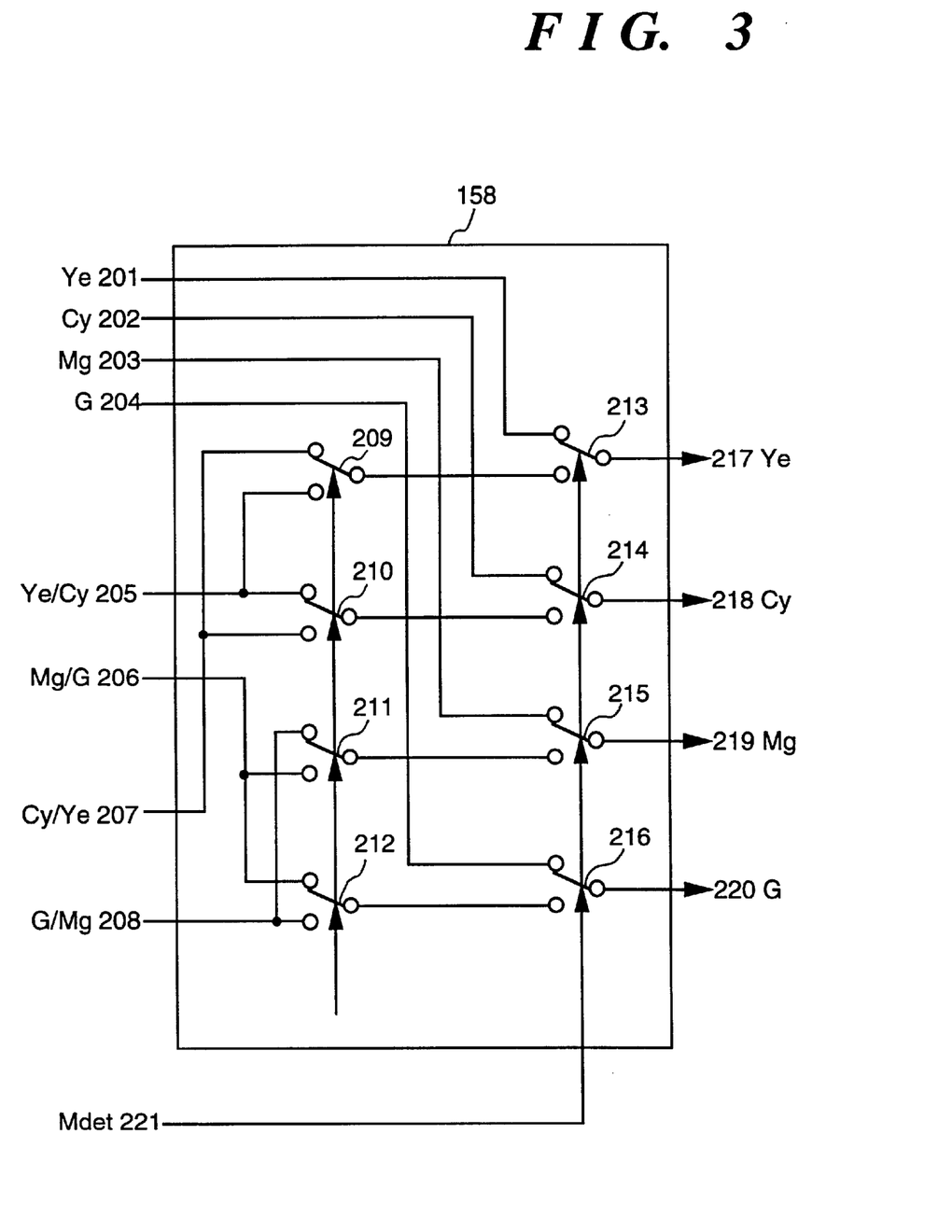
FIG. 3 is a circuit diagram illustrating an example of a selector shown in FIG. 2.

FIG. 3 depicts an example of an internal configuration of the selector 158.

In FIG. 3, signals 201 to 204 correspond to the outputs from the low-pass filters 128 to 131 in FIG. 2, signals 205 and 206 correspond to the outputs from the field memory 6, and signals 207 and 208 correspond to the outputs from the memories 109 and 110.

Since there are phase differences for one field between the signals 205, 206 and the signals 207, 208, when it is assumed that the signals 205 and 206 are signals from the n-th scanning line in FIG. 4 and one field consists of 263 scanning lines (i.e., one frame consists of 526 scanning lines), then the signals 207 and 208 corresponds to signals from the (n +263)-th scanning line.

Each of the signals 205 and 207 enters selectors 209 and 210. Since the order of the Ye filter part and the Cy filter part in the odd lines of a frame is opposite to the order of them in the even lines, phases of the Ye component signal and the Cy component signal are not synchronized. More specifically, when the signal 205 represents a Ye component signal, the signal 207 represents a Cy component signal. Therefore, the selectors 209 and 210 switch by pixel so that Ye component signals always appear as the output from the selector 209 and Cy component signals always appear as the output from the selector 210. As a result, data of the n-th line and data of the (n+263)-th line alternatively appear as the outputs of the respective selectors 209 and 210. An operation similar to above is performed so as to obtain Mg component signals from a selector 211 and G component signals from a selector 212.

The movement detection circuit 7 shown in FIG. 2 detects movement of an input image by inputting both input and output signals to/from the field memory 6 and taking differences of the inputted signals, for example. Then, it determines whether the input image is a moving image or a still image. The movement detection circuit 7 outputs "0", as a signal mdet when it determines that the image is a moving image, for example, and outputs "1" when it determines that the image is a still image.

Selectors 213 to 216 switch to select either the signals 201 to 204 which are applied with conventional intra-line interpolation or the outputs from the selectors 209 to 212, depending upon the value of the signal mdet outputted from the movement detecting unit 7. As a concrete example, if the signal mdet is "0" indicating a moving image, then the selectors 213 to 216 select the signals 201 to 204, whereas, if the signal mdet is "1" indicating a still image, then the selectors 213 to 216 select the outputs from the selectors 209 to 212.

After Ye, Cy, Mg and G component signals are obtained as described above, the processes are the same as the conventional processes explained with reference to FIG. 11.

By performing inter-field interpolation in accordance with movement between fields detected on the basis of the image signals of the fields as described above, the number of pixels of each color component in the horizontal direction is doubled, thereby improving resolution.

<Second Embodiment>

Figure 5:
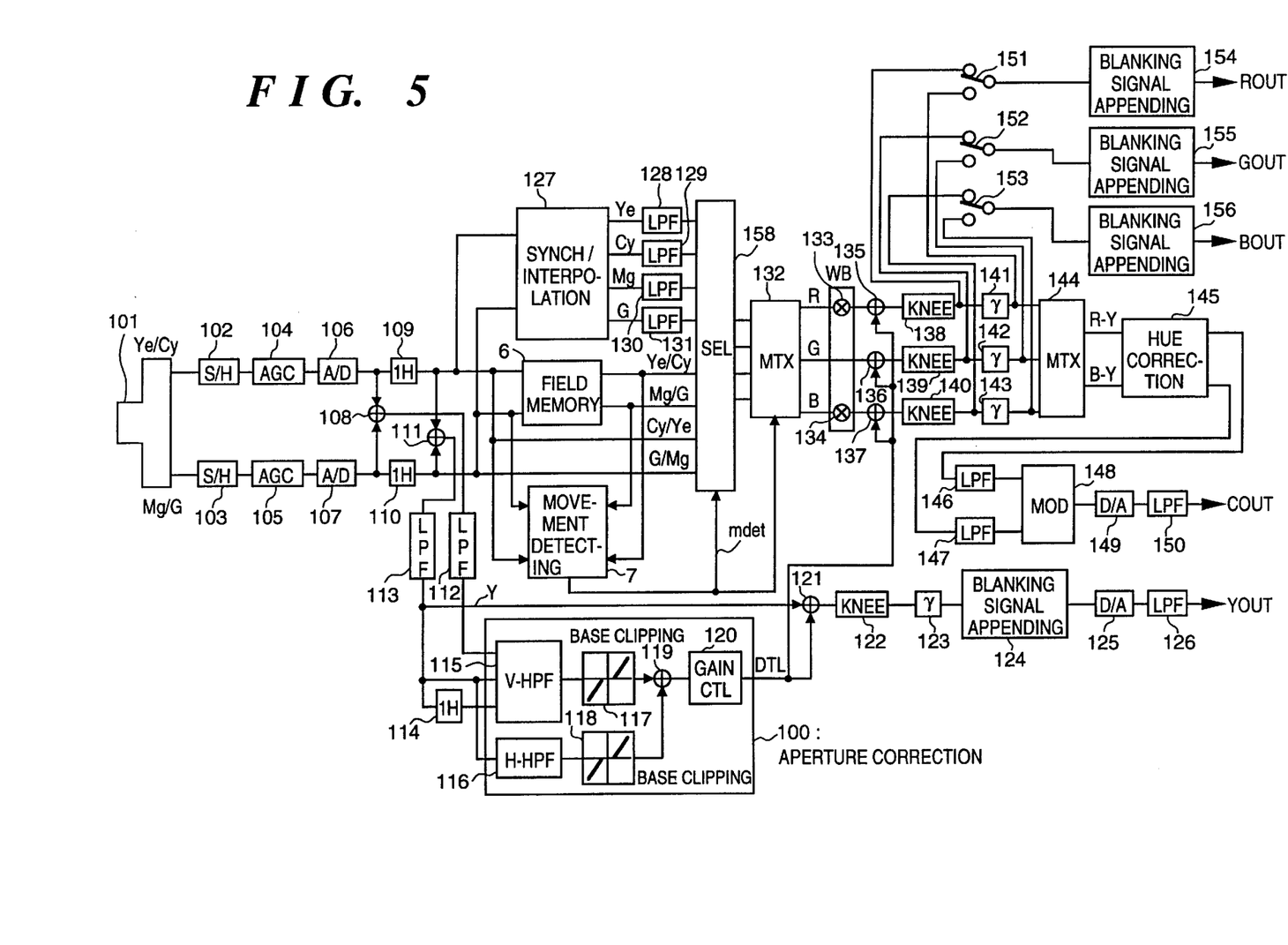
FIG. 5 is a block diagram illustrating a configuration of the image sensing apparatus according to the second embodiment.

Next, a second embodiment will be described with reference to FIG. 5. The second embodiment differs from the first embodiment in a point in which, in addition to the selector 158, the matrix operation circuit is also controlled in accordance with the signal mdet outputted from the movement detecting unit 7. An example of a configuration of the matrix operation circuit 132 is shown in FIG. 6.

Figure 6:
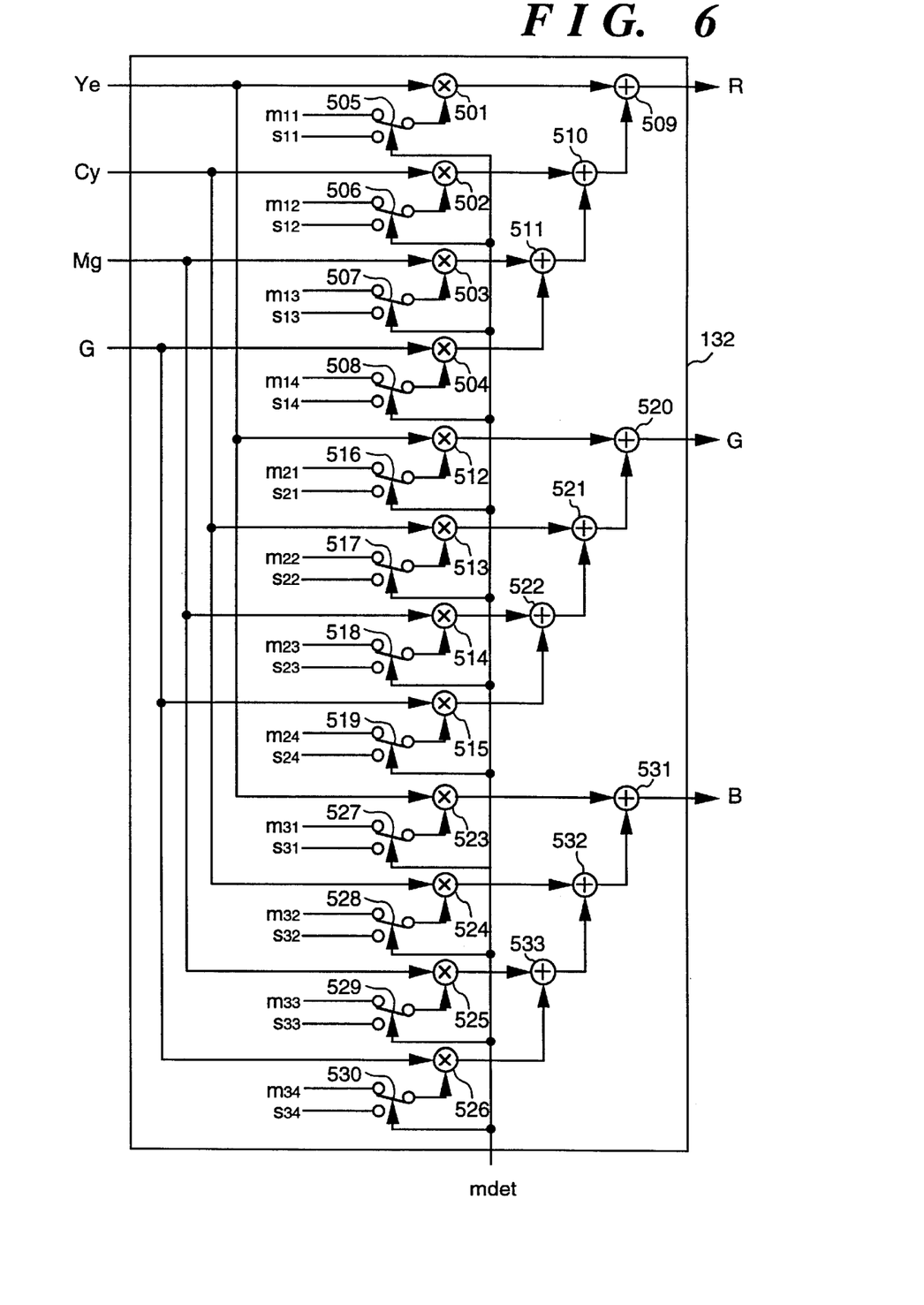
FIG. 6 is a circuit diagram illustrating an example of a matrix operation circuit shown in FIG. 5.

Referring to FIG. 6, the matrix operation circuit 132 inputs four signal components, namely, Ye, Cy, Mg and G, outputted from the selector 158. Matrix operation is performed by using multipliers 501 to 504, 512 to 515 and 523 to 526, and adders 509 to 511, 520 to 522 and 531 to 533. At this time, selectors 505 to 508, 516 to 519 and 527 to 530 are controlled in accordance with the signal mdet outputted from the movement detecting unit 7 to change coefficients to be used in the multipliers.

When the movement detecting unit 7 determines that an input image is a moving image, then the matrix operation circuit as shown in FIG. 6 according to the second embodiment performs intra-field operation by using the following equation 3, $$\begin{pmatrix} R \\ G \\ B \end{pmatrix} = \begin{pmatrix} m_{11} & m_{12} & m_{13} & m_{14} \\ m_{21} & m_{22} & m_{23} & m_{24} \\ m_{31} & m_{32} & m_{33} & m_{34} \end{pmatrix} \begin{pmatrix} Ye \\ Cy \\ Mg \\ G \end{pmatrix} \quad \text{Equation 3}$$

Whereas, when the movement detecting unit 7 determines that an input image is a still image, then inter-field operation is performed by using the following equation 4, $$\begin{pmatrix} R \\ G \\ B \end{pmatrix} = \begin{pmatrix} s_{11} & s_{12} & s_{13} & s_{14} \\ s_{21} & s_{22} & s_{23} & s_{24} \\ s_{31} & s_{32} & s_{33} & s_{34} \end{pmatrix} \begin{pmatrix} Ye \\ Cy \\ Mg \\ G \end{pmatrix} \quad \text{Equation 4}$$

Note, the matrix coefficients used in the equation 3 and the equation 4 are different from each other.

After Ye, Cy, Mg and G component signals are obtained as described above, the processes are the same as the conventional processes explained with reference to FIG. 11.

As described above, it is possible to perform color reproduction suitable to both intra-field processing and inter-field processing by controlling matrix operation by changing matrix coefficients depending upon a case where an input image is determined to be a moving image or a case where an input image is determined to be a still image, determined on the basis of the movement between fields.

Further, as described above, both the intra-field processing and the inter-field processing can be performed by performing signal combining process depending upon the detected result on movement between fields.

Further, by controlling matrix operation in accordance with the detected result on movement between fields, an image output represented by digital R, G and B signals realizing the wider dynamic range in both the moving and still images, for example, can be obtained, thereby achieving high quality image output on a multimedia device.

<Third Embodiment>

Figure 7:
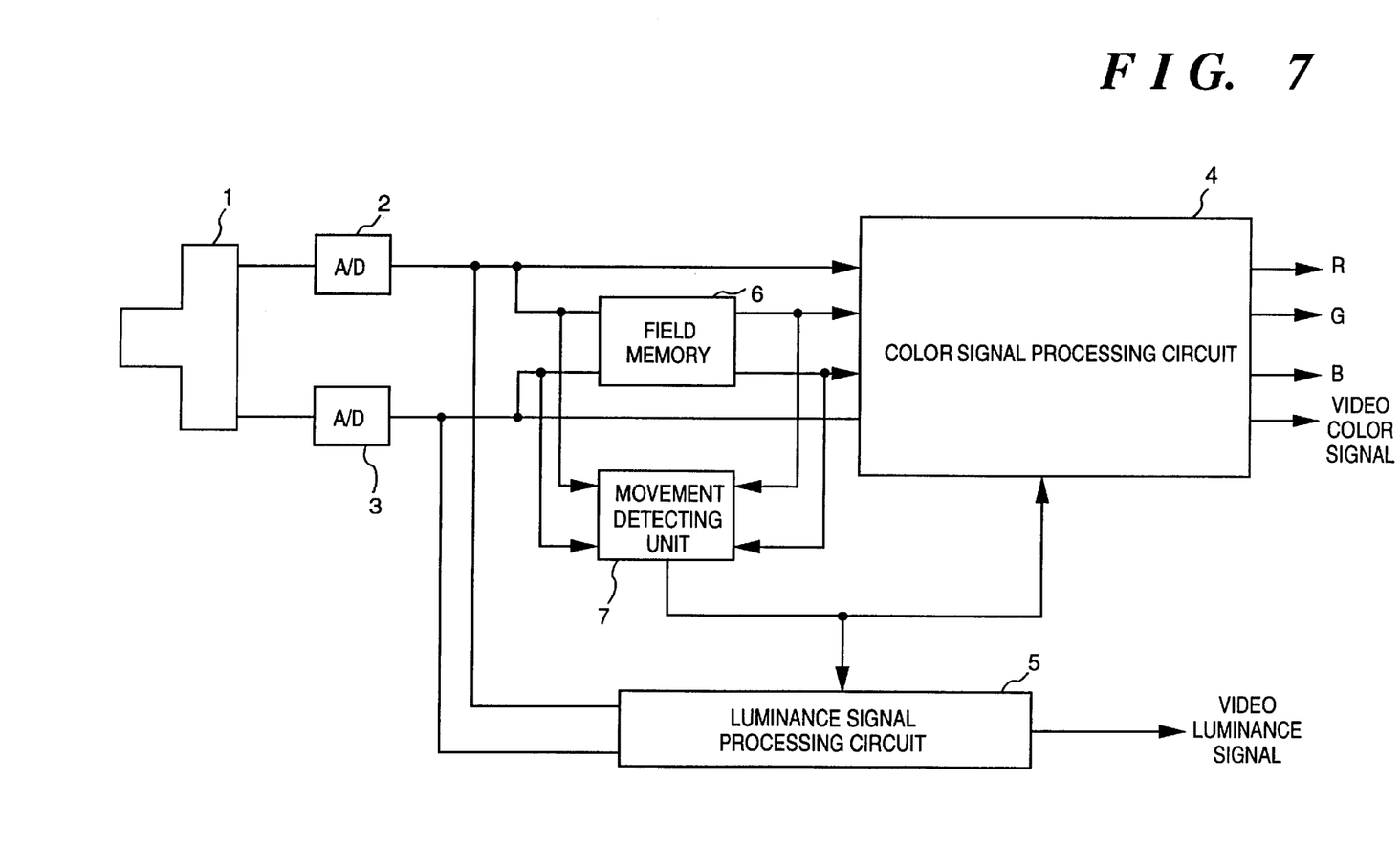
FIG. 7 is a block diagram conceptually illustrating a part of a configuration of an image sensing apparatus according to third and fourth embodiments.

A third embodiment is based on a concept shown in FIG. 7.

In FIG. 7, the same elements and units as those in FIG. 1 are referred by the same reference numerals and explanation of those are omitted.

Referring to FIG. 7, respective signals outputted from two terminals of the solid state image sensing device 1 as in the first embodiment are analog-digital converted into digital signals by the A/D converters 2 and 3. Each of these digital signals are inputted to the color signal processing circuit 4 and the luminance signal processing circuit 5, and applied with predetermined processes. Further, the digital signals are delayed for a time period corresponding to one field of television signals by the field memory 6 which is as delaying means, thereafter enter the color signal processing circuit 4 and the movement detecting unit 7. The movement detecting unit 7 compares signals inputted from the A/D converters 2 and 3 and the signals delayed for the time period corresponding to one field by the field memory 6, then determines whether the input image is a moving image or a still image. The color processing circuit 4 and, in the third embodiment, the luminance signal processing circuit 5 are controlled depending upon the detected result.

Figure 8:
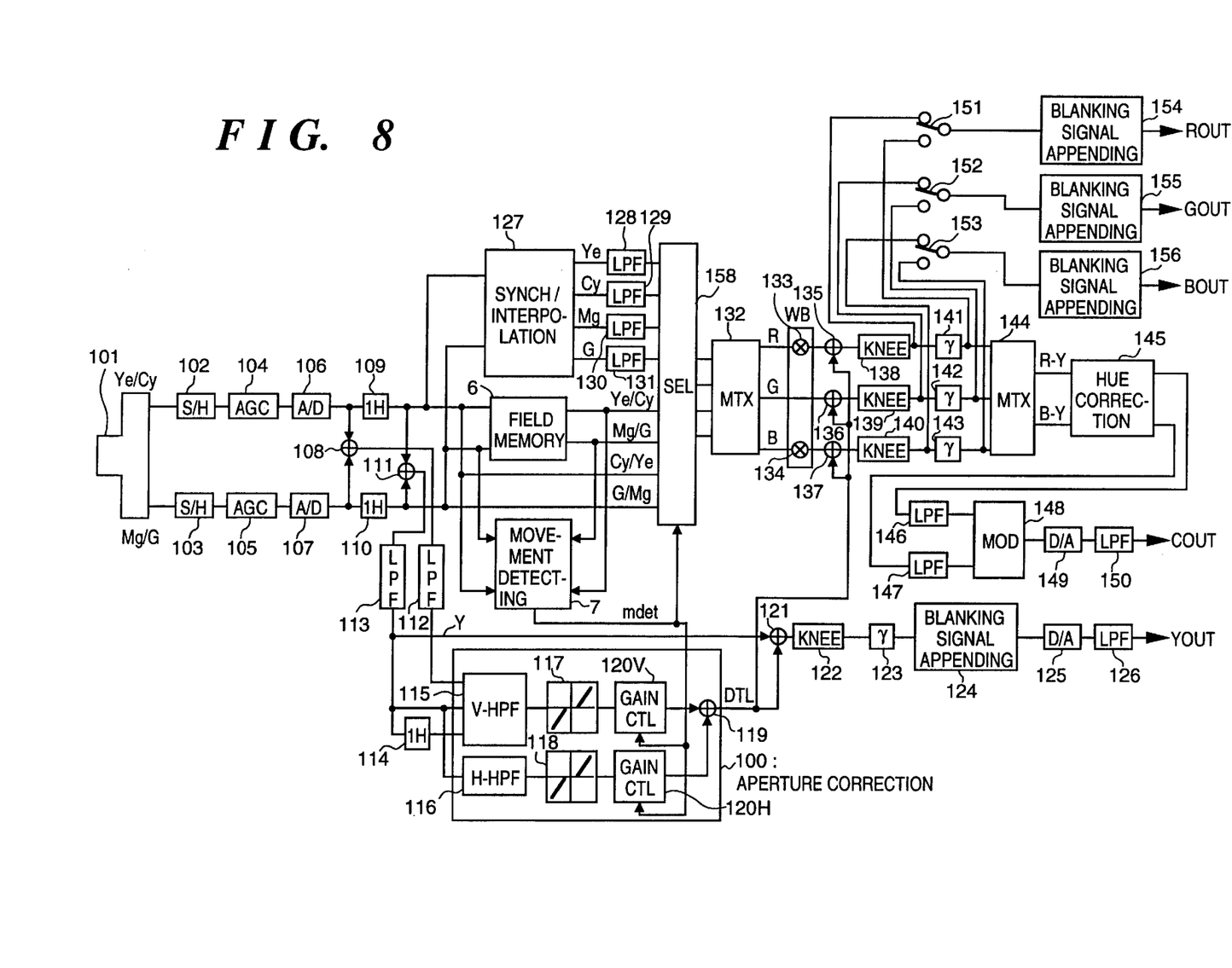
FIG. 8 is a block diagram illustrating a configuration of the image sensing apparatus according to the third embodiment.

FIG. 8 depicts a detailed configuration of the image sensing apparatus according to the third embodiment.

In FIG. 8, the same units and elements as those in FIG. 2 are referred by the same reference numerals and explanation of those are emitted.

In FIG. 8, the field memory 6, the movement detecting unit 7 and the selector 158 are added to the conventional configuration shown in FIG. 11. Further, a gain controller 120V for the vertical direction and a gain controller 120H for the horizontal direction are provided in the aperture correction circuit 100, and the outputs from the gain controllers 120V and 120H are added by the adder 119. The selector 158, the gain controllers 120V and 120H are controlled on the basis of a detected result on movement by the movement detecting unit 7.

Next, an operation of the image sensing apparatus having the aforesaid configuration will be described.

Similarly to the operation explained with reference to FIG. 11, in the third embodiment, the outputs from the memories 109 and 110 for delaying the signals for 1H enter the synchronization/interpolation circuit 127, where color components (here, Ye, Cy, Mg and G) are synchronized. Then, returned components are removed from these respective components by low-pass filters 128 to 131. Thereafter, they are inputted to the selector 158. Meanwhile, the signals outputted from the memories 109 and 110 are delayed for a time period corresponding to one field by the field memory 6, then inputted into the selector 158. In this manner, data from lines indicated as "odd" in FIG. 4 and data from lines indicated as "even" are sent to the selector 158 at the same timing.

Regarding the selector 158, both its configuration and operation are the same as those explained with reference to FIG. 3 in the first embodiment, thus the explanations of those are omitted.

With the interpolation between fields (inter-field interpolation) by using the selector 158, it is possible to double the number of the pixels of each color component in the horizontal direction, thereby improving resolution.

The selectors 213 to 216 selects either the data 201 to 204 processed with conventional intra-line interpolation or the outputs from the selectors 209 to 210 on the basis of the signal mdet outputted from the movement detecting unit 7.

Usually, when a movement is detected in the image by the movement detecting unit 7, the signals which are processed with the conventional intra-line interpolation are selected, whereas when movement is not detected, then the signals processed with the inter-field interpolation are selected.

Figure 10A:
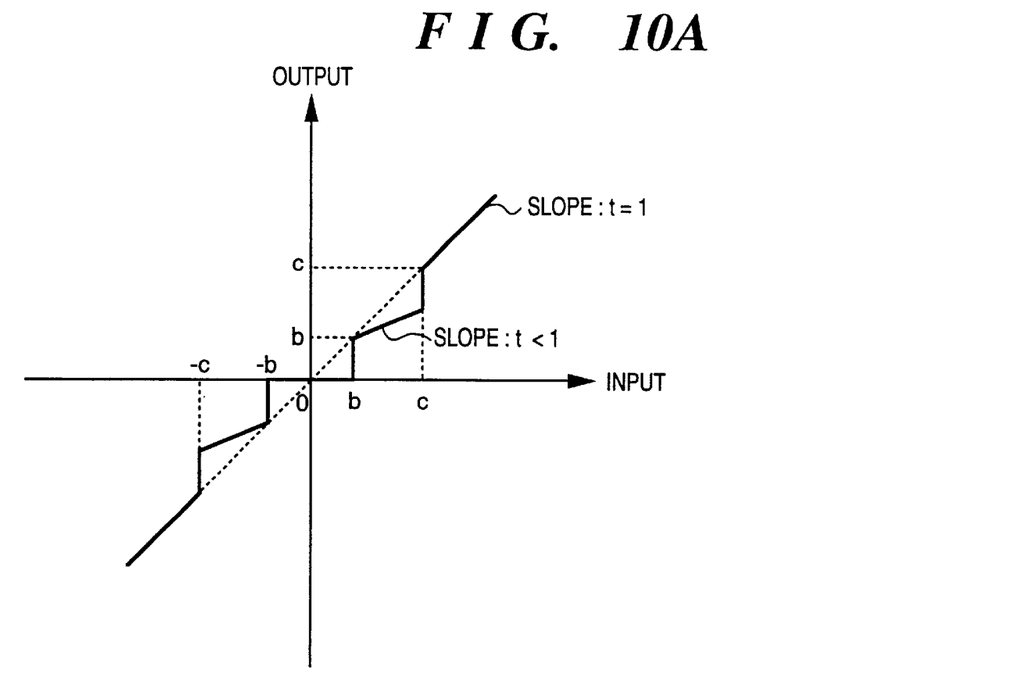
FIG. 10A is a graph showing input/output characteristics of a gain controller shown in FIG. 8 according to the third embodiment.

Meanwhile, the aperture correction of a luminance signal is performed basically in the same manner as in the conventional method. However, in the third embodiment, the gain controllers 120V and 120H are provided independently for the vertical direction and for the horizontal direction in order to constrain aperture correction on a luminance signal of low luminance. An example of the input/output characteristics of the gain controllers 120V and 120H are shown in FIG. 10A. As seen from the graph, gain in the low luminance part is low. The input/output characteristics of the gain controllers 120V and 120H are controlled in accordance with the signal mdet outputted from the movement detecting unit 7. More specifically, the values of b, c and t shown in FIG. 10A are changed in accordance with the value of the signal mdet. Thereby, it is possible to realize to suitably constrain aperture correction on low luminance signals of both a moving image and a still image.

According to the third embodiment as described above, with delaying means, such as the field memory, and movement detecting means, the contents of luminance signal processing and color signal processing can be changed in accordance with when a moving image is inputted and when a still image is inputted, and an output image of high quality can be obtained both in the cases of displaying the moving image and displaying the still image.

Note, the gain controllers 120V and 120H can be configured by a hardware or can be realized by writing the input/output characteristics in ROM or the like.

Further, the movement detecting unit 7 takes both the input and output signals to/from the field memory 6, then checks whether there is a moving component by taking the differences between the input and the output signals to/from the field memory 6. Thereby, the movement detecting unit 7 determines whether the input image is a moving image or a still image, and outputs either "0" or "1" as the signal mdet.

After Ye, Cy, Mg and G component signals are obtained as described above, the processes are the same as the conventional processes explained with reference to FIG. 11.

<Fourth Embodiment>

Figure 9:
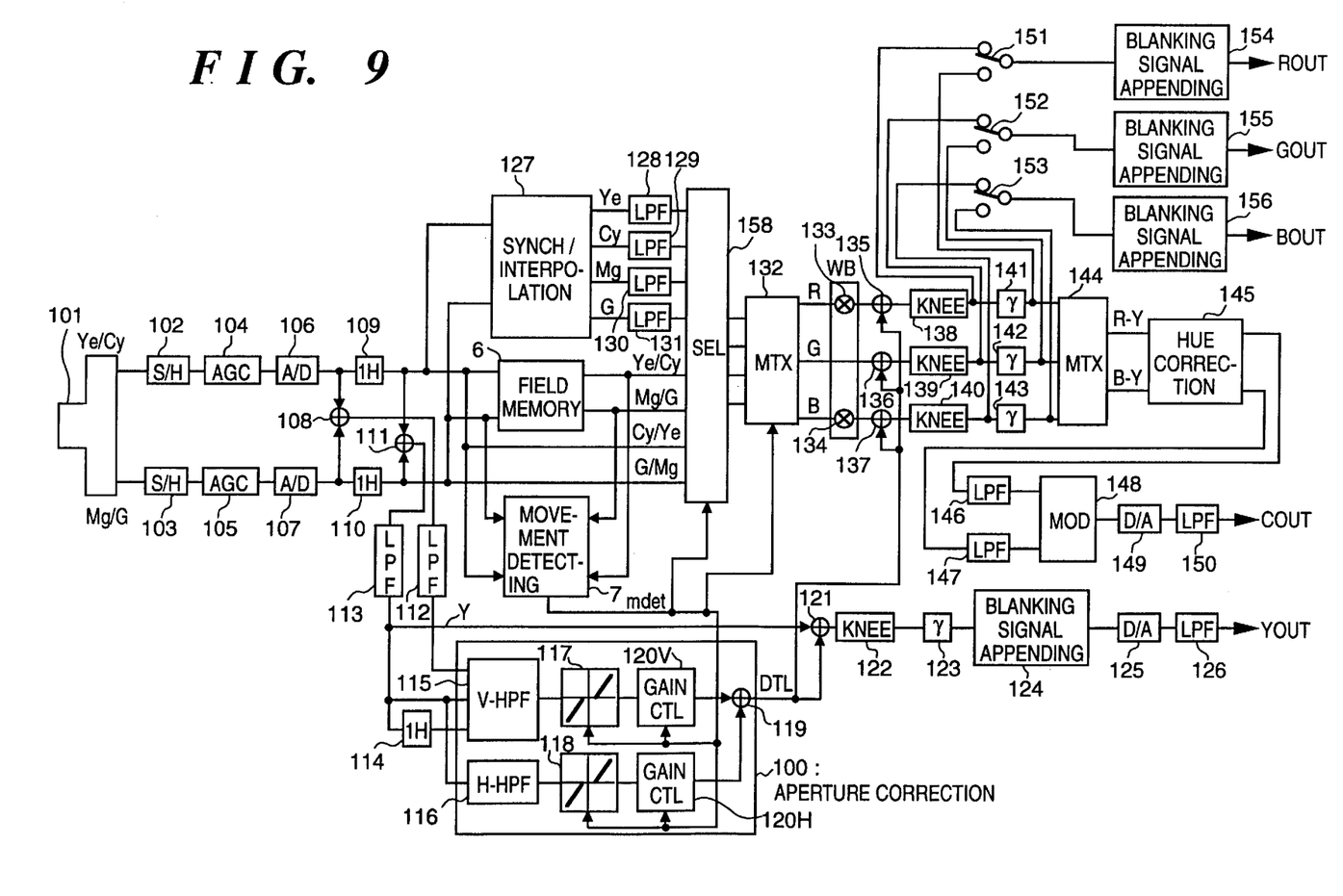
FIG. 9 is a block diagram illustrating a configuration of the image sensing apparatus according to the fourth embodiment.

FIG. 9 depicts a configuration of an image sensing apparatus according to a fourth embodiment of the present invention.

The fourth embodiment differs from the third embodiment in a point which, in addition to the selector 158 and the gain controllers 120V and 120H, the matrix operation circuit 132 and the base-clipping circuits 117 and 118 are controlled on the basis of the signal mdet outputted from the movement detecting unit 7.

In the matrix operation circuit 132, matrix coefficients are changed in accordance with the signal mdet outputted from the movement detecting unit 7, thereby achieving suitable color reproduction of both a moving image and a still image. A specific operation of the matrix operation circuit 132 is as explained in the second embodiment, for example.

Figure 10B:
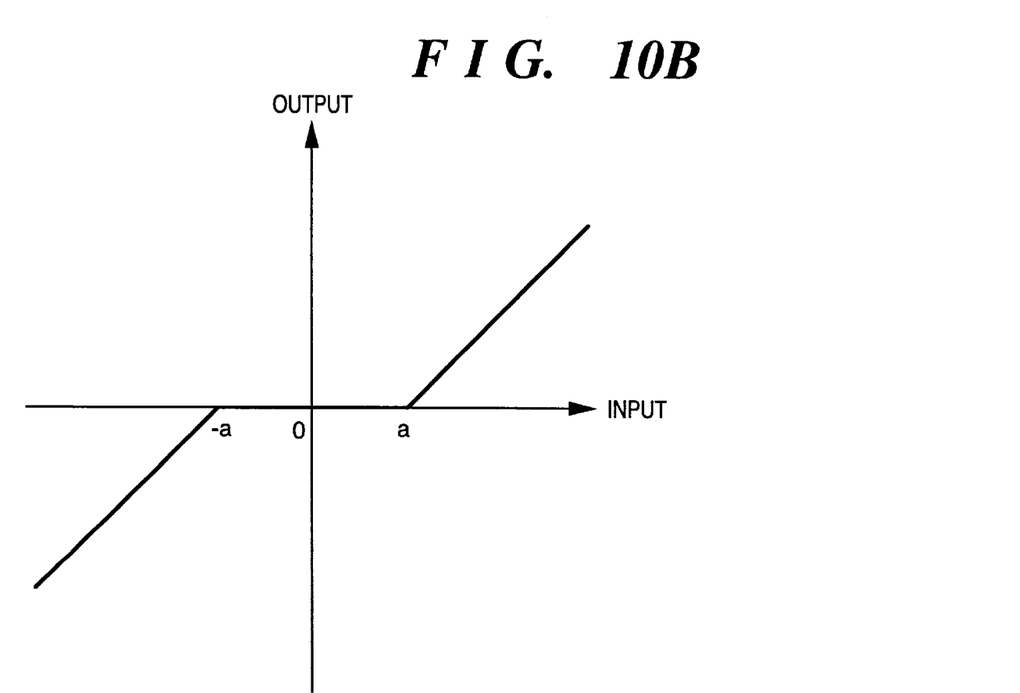
FIG. 10B is a graph showing input/output characteristics of a base-clipping circuit shown in FIG. 9.

The input/output characteristics of the base-clipping circuits 117 and 118 in the aperture correction circuit 100 are shown in FIG. 10B. These circuits realize noise removal by outputting "0" for an input signal having an amplitude smaller than a value a. The value a governing the input/output characteristics of the base-clipping circuits 117 and 118 is changed in accordance with the value of the signal mdet outputted from the movement detecting unit 7, thereby achieving suitable noise removal from an aperture correction signal for both a moving image and a still image.

According to the fourth embodiment of the present invention as described above, with delaying means, such as the field memory, and movement detecting means, contents of luminance signal processing and color signal processing can be changed in accordance with when a moving image is inputted and when a still image is inputted, and an output image of high quality can be obtained both in the cases of displaying the moving image and displaying the still image.

Note, the base-clipping circuits 117 and 118 can be configured by a hardware or can be realized by writing the input/output characteristics in ROM or the like.

The present invention can be applied to a system constituted by a plurality of devices or to an apparatus comprising a single device.

Further, a field memory is used as the movement detecting unit 7 in the aforesaid embodiments. However, a frame memory can be used instead of the field memory to achieve more precise detection of movement in an image.

Further, the object of the present invention can be also achieved by providing a storage medium storing program codes for performing the aforesaid processes to a system or an apparatus, reading the program codes with a computer (e.g., CPU, MPU) of the system or apparatus from the storage medium, then executing the program.

In this case, the program codes read from the storage medium realize the functions according to the embodiments, and the storage medium storing the program codes constitutes the invention.

Further, the storage medium, such as a floppy disk, a hard disk, an optical disk, a magneto-optical disk, CD-ROM, CD-R, a magnetic tape, a non-volatile type memory card, and ROM can be used for providing the program codes.

Furthermore, besides aforesaid functions according to the above embodiments are realized by executing the program codes which are read by a computer, the present invention includes a case where an OS (operating system) or the like working on the computer performs a part or entire processes in accordance with designations of the program codes and realizes functions according to the above embodiments.

Furthermore, the present invention also includes a case where, after the program codes read from the storage medium are written in a function expansion card which is inserted into the computer or in a memory provided in a function expansion unit which is connected to the computer, CPU or the like contained in the function expansion card or unit performs a part or entire process in accordance with designations of the program codes and realizes functions of the above embodiments.

The present invention is not limited to the above embodiments and various changes and modifications can be made within the spirit and scope of the present invention. Therefore to appraise the public of the scope of the present invention, the following claims are made.

What is claimed is:

1. An image sensing apparatus comprising:
   image sensing means for sensing an image of an object and generating first image signals and second image signals;
   delaying means for delaying the first image signals for a predetermined time period and outputting delayed image signals corresponding to each of the first image signals;
   detecting means for detecting movement of the image on the basis of comparing the second image signals against the delayed image signals;
   first processing means, which includes
      combining means for combining the second and delayed image signals and
      selecting means for selecting the first image signals when said detecting means has detected movement in the image sensed by said image sensing means, and for selecting the combined image signals obtained by said combining means when said detecting means has not detected movement in the image.
      wherein said first processing means is for applying a predetermined image process to color components of either the combined image signals or the first image signals, as selected by said selecting means; and
      second processing means for applying a predetermined image process to a luminance component of the first image signals in accordance with the detected result detected by said detecting means,
      wherein the first image signals are produced during first image scanning periods and the second image signals are produced during second image scanning periods immediately following first image scanning periods.

2. The image sensing apparatus according to claim 1, wherein said image sensing means performs interlace scanning and alternatively outputs image signals of the sensed image in an odd-number field and an image in an even number field, and said delaying means delays the first image signals for a time period corresponding to one field.

3. The image sensing apparatus according to claim 1, wherein said delaying means delays the first image signals for a time period corresponding to one frame.

4. The image sensing apparatus according to claim 1, wherein said second processing means has gain control means for controlling a gain for the luminance component of the first image signals in accordance with the detected result detected by said detecting means.

5. The image sensing apparatus according to claim 1, wherein said second processing means has base-clipping means for removing a signal component which is less than a predetermined value determined in accordance with the detected result by said detecting means from the first image signals.

6. The image sensing apparatus according to claim 1 further comprising matrix operation means for performing matrix operation on the image signals processed by said first processing means on the basis of the detected result detected by said detecting means.

7. The image sensing apparatus according to claim 6, wherein said matrix operation means performs operation by using different matrix coefficients changed on the basis of the detected result by said detecting means.

8. The image sensing apparatus according to claim 6, wherein said matrix operation means performs intra-field processing when the detecting means has detected movement in the image sensed by said image sensing means, and performs inter-field processing when the detecting means has not detected movement in the image.

9. An image sensing method comprising:

an image sensing step of sensing an image of an object and generating first image signals and second image signals;

a delaying step of delaying the first image signals for a predetermined time period and outputting delayed image signals corresponding to each of the first image signals;

a detecting step of detecting movement of the image on the basis of comparing the second image signals against the delayed image signals;

a combining step of combining the second and delayed image signals, a selecting step of selecting the first image signals when movement in the image has been detected in said detecting step, and selecting the combined image signals obtained in said combining step when movement in the image has not been detected in said detecting step;

a first processing step of applying a predetermined image process to color components of either the combined image signals or the first image signals selected in said selection step; and a second processing step of applying a predetermined image process to a luminance component of the first image signals in accordance with the detected result detected at said detecting step, wherein the first image signals are produced during first image scanning periods and second image signals are produced during second image scanning periods immediately following first image scanning periods.

10. The image sensing method according to claim 9, wherein, at said image sensing step, interlace scanning is performed and image signals of the sensed image in an odd-number field and an image in an even number field are alternatively outputted, and at said delaying step, the first image signals are delayed for a time period corresponding to one field.

11. The image sensing method according to claim 10 further comprising a matrix operation step of performing matrix operation on the image signals processed at said first processing step on the basis of the detected result at said detecting step.

12. The image sensing method according to claim 9, wherein, at said delaying step, the first image signals are delayed for a time period corresponding to one frame.

13. An image sensing apparatus comprising:

an image sensor for generating a sensed image signal;

delaying means for delaying the sensed image signal to produce a delayed image signal;

detecting means for detecting movement of an image by comparing the delayed image signal and the sensed image signal;

combining means for combining the delayed image signal and the sensed image signal produce a combined image signal; and processing means for processing only the combined image signal when said detecting means detect lack of movement of the image, and for processing only one of the sensed image signal and the delayed image signal when said detecting means detects movement of the image.

14. The apparatus according to claim 13, wherein said processing means processes one of the sensed image signal and the delayed image signal with first color matrix coefficients when said detecting means detects movement of the image and processes the combined image signal with second color matrix coefficients when said detecting means detects lack of movement of the image.

15. The apparatus according to claim 13, wherein said image sensor has two output channels for outputting sensed image signals simultaneously.

16. The apparatus according to claim 13, wherein said delaying means delays the sensed image signal for a field period.

17. An image sensing apparatus comprising:

an image sensor for generating a sensed image signal;

delaying means for delaying the sensed image signal to produce a delayed image signal;

detecting means for detecting movement of an image by comparing the delayed image signal and the sensed image signal; and;

processing means for processing the sensed image signal with first color matrix coefficients when said detecting means detects movement of the image and for processing the sensed image signal with second color matrix coefficients when said detecting means detects lack of movement of the image.

18. The apparatus according to claim 17, further comprising:

combining means for combining the delayed image signal and the image signal to produce a combined image signal.

19. The apparatus according to claim 18, wherein said processing means processes the combined image signal when said detecting means detects lack of movement of the image, and processes the sensed image signal when said detecting means detects movement of the image.

* * * * *

UNITED STATES PATENT AND TRADEMARK OFFICE
CERTIFICATE OF CORRECTION

PATENT NO. : 6,380,973 B1
DATED : April 30, 2002
INVENTOR(S) : N. Kawahara

It is certified that error appears in the above-identified patent and that said Letters Patent is hereby corrected as shown below:

Column 10,
Line 28, after the words "in the image", please delete the "." and substitute therefor -- , --.

Signed and Sealed this

Twenty-fifth Day of June, 2002

Attest:

Attesting Officer

JAMES E. ROGAN
Director of the United States Patent and Trademark Office